April 18, 1939. P. K. BEEMER 2,154,558
MOTOR VEHICLE
Filed Jan. 19, 1934 3 Sheets-Sheet 2

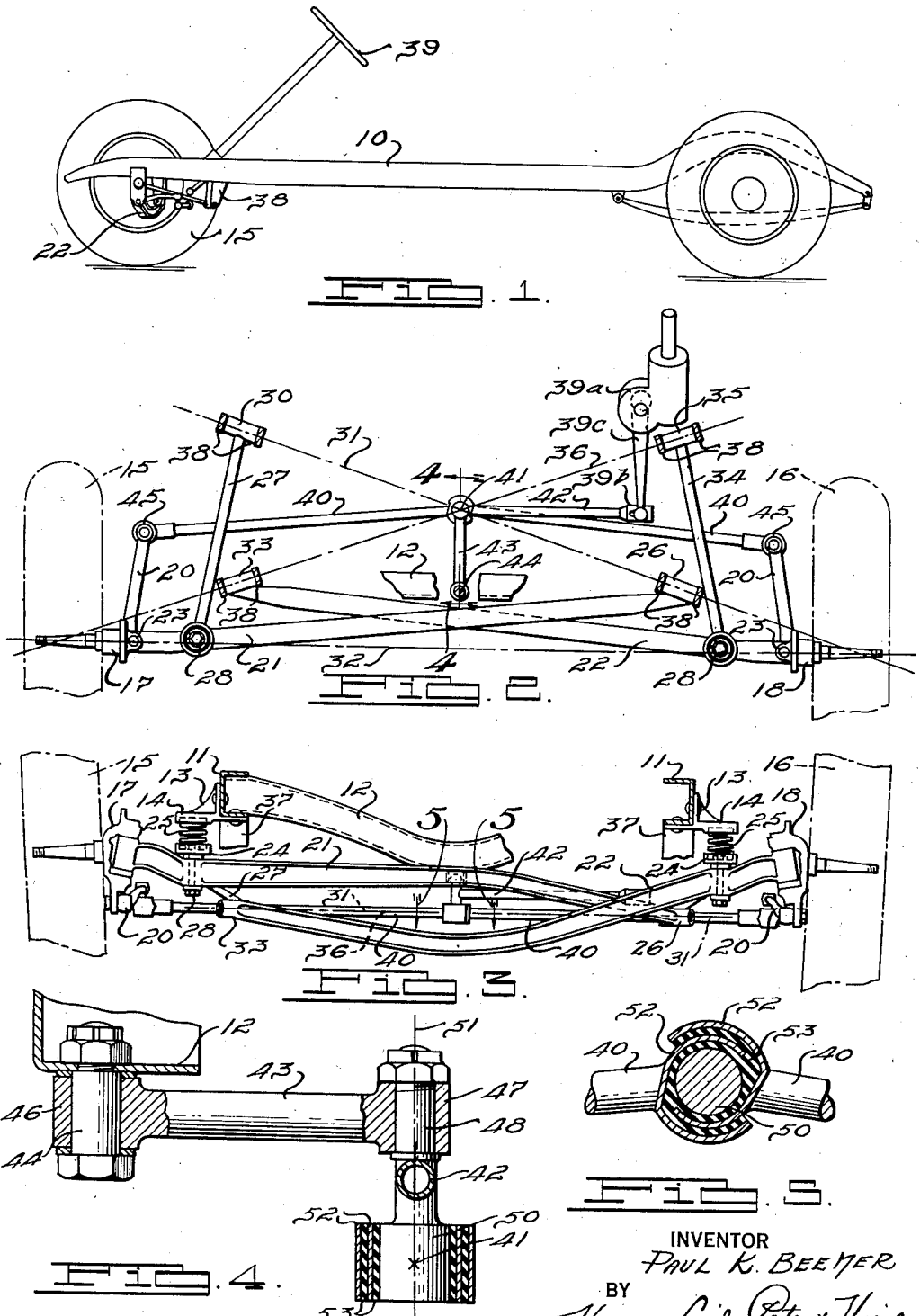

INVENTOR.
PAUL K. BEEMER
BY
Harness, Dind, Patee & Harris
ATTORNEYS

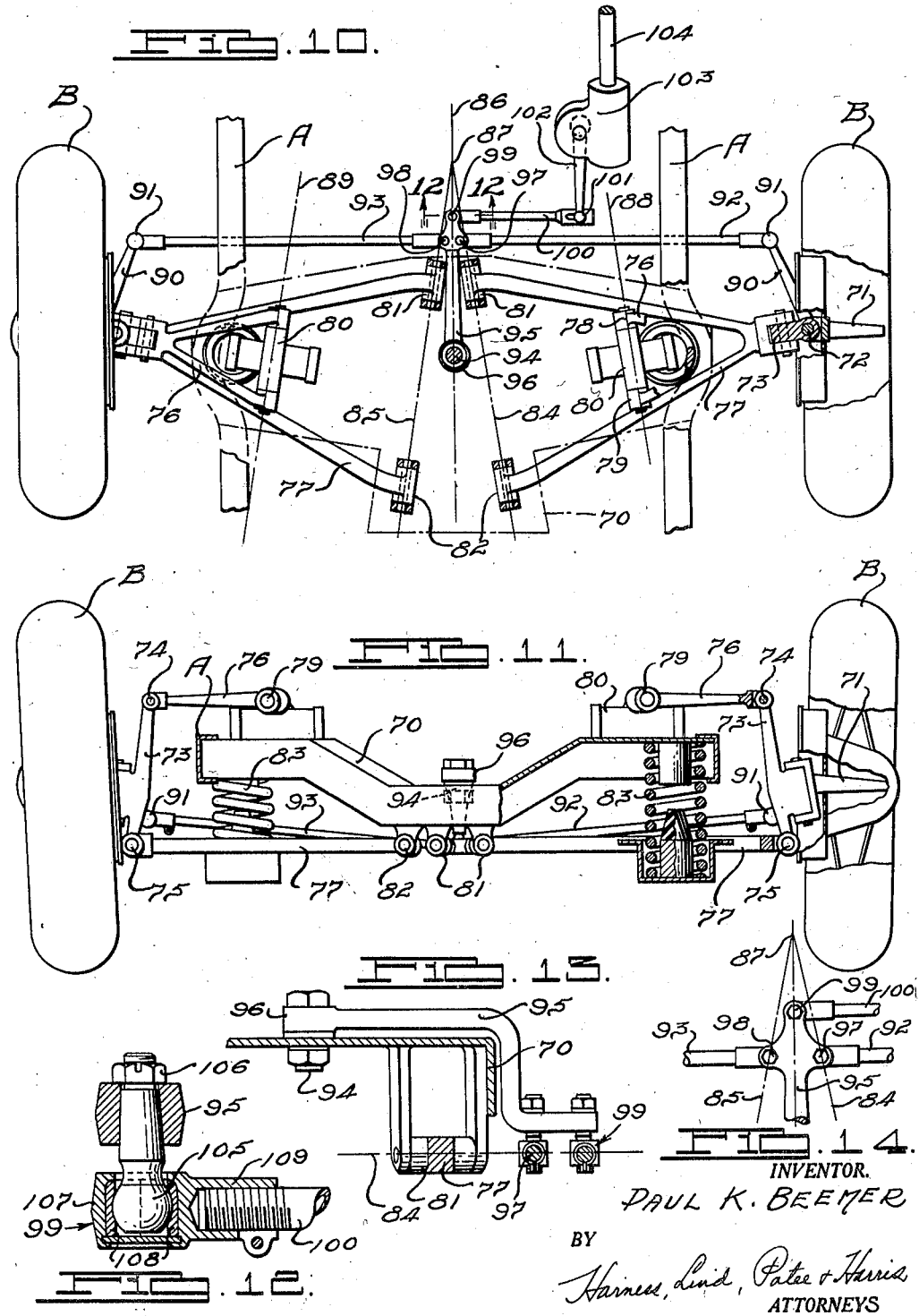

Patented Apr. 18, 1939

2,154,558

UNITED STATES PATENT OFFICE 2,154,558

MOTOR VEHICLE

Paul K. Beemer, Highland Park, Mich., assignor to Chrysler Corporation, Detroit, Mich., a corporation of Delaware Application January 19, 1934, Serial No. 707,242

12 Claims. (Cl. 280—96.2)

This invention relates to automotive vehicles and more especially to independent wheel suspension constructions, and in the instance of steerable wheels, to steering connections employed in conjunction with such wheel suspension constructions.

Among the objects of the invention are to provide improved wheel suspension mechanism for an automotive vehicle; to provide wheel suspension mechanism particularly adapted for independently sprung wheels; to provide a wheel suspension mechanism to which practically all types of springs or equivalent cushioning means are applicable; to provide wheel suspension means for independently sprung wheels which afford longitudinal and transverse rigidity; to provide wheel suspension means for independently sprung wheels which has a long effective swinging radius so that very little change in tread or camber of steerable wheels is caused during operation of the vehicle; to reduce to a minimum the number of moving joints per wheel for independently sprung wheel suspension means; to provide independent wheel suspension mechanism for each of a pair of steerable wheels such that each wheel oscillates about an axis intersecting a like axis of the other wheel suspension means at a point about which steering control originates; and to provide in conjunction with the above type of suspension means for steerable wheels, steering mechanism having correct steering geometry unaffected by displacement of the wheels of the vehicle during operation of the latter.

A further object of my invention resides in the provision of an improved steering means for the steering ground wheels of a motor vehicle. While this feature of my invention has particular significance in connection with wheels of the so-called independently sprung type, my improvements are not necessarily limited thereto since many of the advantages derived by my improved steering means may be realized in connection with other types of wheel mountings.

Further objects of my invention reside in the provision of an improved vehicle steering mechanism wherein road shocks encountered by the steering wheels are transmitted to the steering wheel gear independently of the usual drag link supporting bearing; also in the provision of an idler guide link for guiding the inner ends of the tie rods and wherein the steering forces and wheel road shock are transmitted substantially independently of the guide link bearing; also in the provision of a generally improved and more efficient steering mechanism capable of relative long usage without repair, and arranged to minimize and eliminate tendencies of the steering wheels to produce gyroscopic reactions, shimmy or tramp, under normal action and wheel displacement upwardly and downwardly.

A further object of my invention resides in an improved arrangement of steering wheel suspension and steering mechanism so arranged as to permit either steering wheel to be displaced upwardly and downwardly during rotation thereof without altering, within practical limits, the steering position of such wheel, particularly when the vehicle is moving straight ahead.

Other objects and advantages will become apparent from the following description and appended claims.

For the purpose of illustrating the genus of the invention, typical concrete embodiments thereof are shown in the accompanying drawings, wherein:

Fig. 1 is a side elevation of the chassis of an automotive vehicle embodying a wheel suspension and steering mechanism according to this invention;

Fig. 2 is a top plan of the wheel suspension mechanism arranged at the front portion of the chassis shown in Fig. 1;

Fig. 3 is a front end elevation of the mechanism shown in Figs. 1 and 2;

Fig. 4 is an enlarged section taken on the line 4—4 of Fig. 2;

Fig. 5 is an enlarged section taken on the line 5—5 of Fig. 3; and

Figure 6:
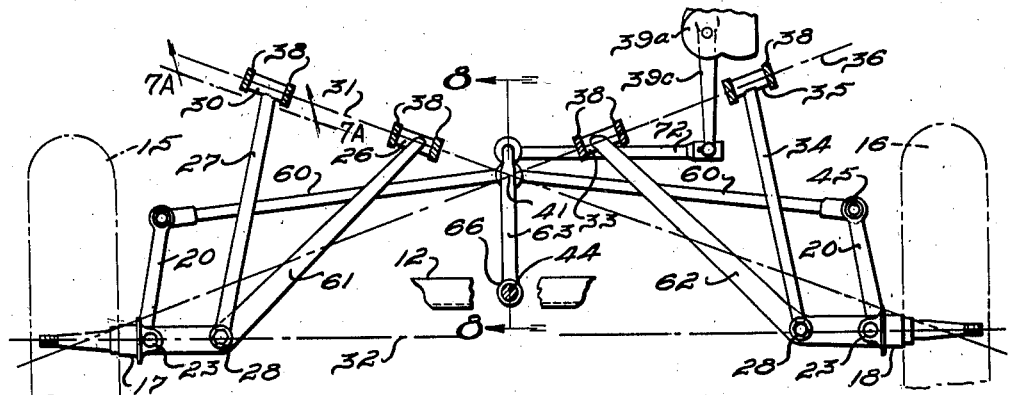
Figure 7:
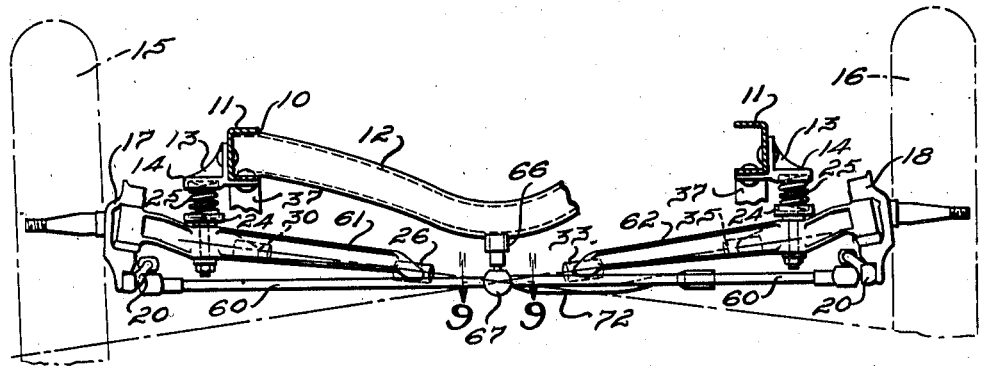
Figures 7A, 8:
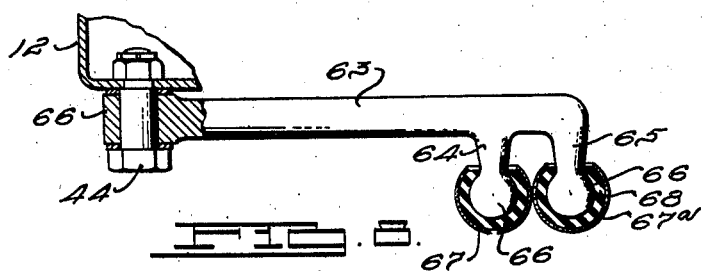
Figure 9:
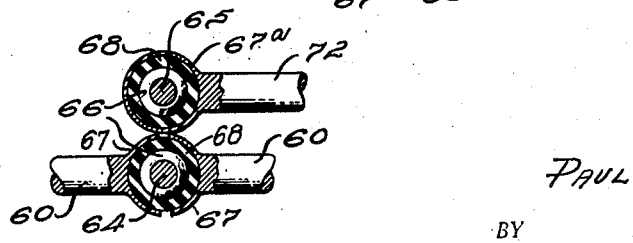

Figs. 6, 7, 8 and 9 are views similar to Figs. 2, 3, 4, 5, respectively, and showing a modified form of wheel suspension and steering mechanism, the sections shown in Figs. 8 and 9 being taken on the lines 8—8 and 9—9 of Figs. 6 and 7, respectively;

Fig. 7A is an enlarged detail sectional perspective view of a typical wheel suspension link support, the section being taken along the line 7A—7A of Fig. 6;

Fig. 10 is a plan view of a forward portion of a motor vehicle illustrating a further modified form of my invention;

Fig. 11 is a front elevational view of the vehicle chassis shown in Fig. 10 with portions thereof broken away to illustrate the spring suspension;

Fig. 12 is a sectional elevational view of the universal joint connection between the drag link and idler guide link of Fig. 10, the section being taken along line 12—12 thereof.

Fig. 13 is a detail elevational view partly in cross-section showing the idler steering link of Fig. 10.

Fig. 14 is a detail fragmentary plan view of a slightly modified form of the steering linkage arrangement of Fig. 10.

Referring to the drawings and more especially to Figs. 1 to 5 thereof, the numeral 10 designates the chassis frame of an automotive vehicle and comprises side sills 11 and a cross member 12. Outrigger brackets 13 are provided, preferably at or adjacent the juncture of the cross member and side rails and have upper spring pad portions 14 arranged thereon by which the chassis frame may be resiliently supported from the running gear of the vehicle.

The wheel suspension mechanism, according to this invention, may be applied to either the front or rear wheels, or both, of the vehicle. In the present instance the application of the suspension mechanism will be described as applied only to the steerable wheels of the vehicle. The front wheels 15 and 16 are each provided with a steering spindle knuckle 17 or 18 and each steering knuckle is provided for each of the wheels 15 or 16 and is pivotally connected at one end by means of a steering knuckle pivot pin 23 to the steering knuckle 17 or 18. The axles 21 and 22 are provided with lower spring pads 24 cooperating with resilient or cushioning means 25 and the upper spring pads 14 for resilient supporting of the chassis frame on the running gear of the vehicle. While in the present instance the resilient means 25 is disclosed as in the form of coiled or helical springs, it is noted that other desired types of springs or cushioning means may be employed.

The line 4—4 of Fig. 2 may be assumed to represent the central longitudinal axis of the chassis frame 10. The axle 21 is pivotally connected at one end by means of a steering knuckle pivot pin 23 to the steering knuckle 17 for wheel 15 and at the opposite end is provided with a bearing 26 by which it is pivotally connected to the chassis frame 10. A distance member 27 is connected at one end to the axle 21 and may be secured thereto by means of the same bolt 28 which connects the lower spring pad 24 to this axle member. The opposite end of the distance member 27 is provided with a bearing 30 having its axis in alignment with the axis of the bearing 26 provided at the axle end. The axis, designated 31, of the bearings 30 and 26 is arranged at an angle both with respect to the central longitudinal axis 44 of the chassis frame 10 and with respect to a transverse axis of such frame. The axle 21 extends from its pivotal connection to the wheel spindle 17 to the opposite side of the central longitudinal axis 4—4 of frame 10 so that the axis 31 of the bearings 30 and 26 intersects the plane of the axes of the spindle knuckle pivot pin 23 at a point approximately midway of the length of the spindle of the steering knuckle 18 when the wheels 15 and 16 are aligned for straight line forward motion of the vehicle. The axle 22 is also provided with a bearing 33 at one end thereof by which it is pivotally connected to the chassis frame 10 and is pivotally connected at the opposite end by means of the steering knuckle pivot pin 23 to the steering knuckle 18. A distance member 34 is connected at one end to the axle 22 by means of a bolt 28 and is provided upon the opposite end with a bearing 35 whose axis 36 is aligned with the axis of the bearing 33 and this axis is arranged at an angle with respect to both the central longitudinal axis 44 of the chassis frame and with respect to a tranverse axis thereof. The axis 36 of the bearings 33 and 35 intersects the plane 32 of the axes of the spindle knuckle pivot pins 23 at a point outside the pivot pin 23 for the steering knuckle 17 and at approximately the midpoint of the length of the spindle for the steering knuckle 17, with the parts in the position shown in Fig. 2.

As viewed in Fig. 2, it will be noted that both of the axles 21 and 22 are deflected slightly in a rearward direction adjacent the bolts 28 so that the bearings 26 and 33 are disposed rearwardly of the remaining portions of the axle and substantially in the line of the cross member 12 so that they may be mounted on supports extended downwardly from frame 10 such as depending members 37 connected to the frame 10 at the juncture of the cross member 12 and side rails 11. Referring to Fig. 3, it will also be noted that the axle 21 is bowed upwardly and the axle 22 downwardly at intermediate portions of these axles so that there will be no interference therebetween as the wheels 15 and 16 are displaced during operation of the vehicle.

It will be noted from Figs. 2 and 3 that the bearings 30 and 33 are disposed in the same longitudinal vertical plane as one of the side rails 11 and the bearings 26 and 35 are disposed in the longitudinal vertical plane of the other side rail 11, and that the bearings of each pair 26 and 30 and 33 and 35 are spaced fixed distances apart by means of the frame 10 and such cross members thereof as indicated at 12 so that the frame 10 serves as a rigid structural member acting along the axes 31 or 36 to space such pairs of bearings fixed distances apart. Since the frame 10 maintains the bearings 26 and 30 or 33 and 35 fixed distances apart, it will be immaterial as to whether the frame 10 is a chassis frame alone or a combined chassis and body frame. With the frame forming a rigid structural element acting along the axes 31 or 36, the wheel suspension means in each instance is in the form of a triangle having the body at one side, a distance member as a second side and the axle as a third side forming a statically determinate and substantially planar structure, the only departure from a single plane being due to the bowing of the axles in the vertical direction as shown in Fig. 3 to prevent interference therebetween during displacement of the wheels. Thus the wheel suspension means for each wheel will constitute three members, the frame, a distance member, and an axle connected by three joints so that each wheel suspension means will be rigid both in a longitudinal and transverse direction. To prevent relative axial movement of the bearings 30 and 26 or 33 and 35, end members 38 are provided for each bearing and rigidly fixed relative to the frame 10 to support members such as 37 of Fig. 3. In Fig. 7A I have illustrated a typical support 37, such support being shown in connection with the embodiment of my invention illustrated in Figs. 6 to 9, inclusive, and more particularly hereinafter referred to.

During operation of the vehicle, the suspension structure for the wheel 15 will oscillate about the axis 31 and the suspension structure for the wheel 16 will oscillate about the axis 36. In each instance the wheels 15 or 16 will have a long effective transverse swinging radius substantially equal to the tread between the wheels so that little change in tread or camber of the wheels will be caused by displacement of the wheels due to irregularity of the road surface. It is also noted that as a matter of practical operation there will be on appreciable transverse dragging of the tires along the road surface, due to the long effective transverse swinging radius of each wheel suspension construction. While the effective swinging radius of each wheel in a longitudinal direction is considerably shorter, it is noted that relative rotation of the wheels on the spindles 17 or 18 in the illustrated embodiment or relative rotation of the wheels through a differential mechanism (not shown) in case power is transmitted through the wheels will prevent dragging of the tires along the road surface in a longitudinal direction.

In the interests of clarity and convenience I will, for the most part, describe and hereinafter claim my steering mechanism only as the mechanism is adjusted to position to steering wheels for a normal straight ahead movement of the vehicle. Obviously the geometry of the parts as thus set forth will vary as the steering wheels are moved from their normal straight ahead positions.

In the steering construction employed in conjunction with the wheel suspension mechanism illustrated in Figs. 1 to 5 inclusive, the steering knuckle arms are connected by a pair of securing knuckle tie rods 40 which, in one embodiment of my invention and when wheels 15 and 16 are directed straight ahead, are interconnected at, or brought into relatively close proximity to, a point 41 coinciding with the intersection of the axis of oscillation 31 and 36 of the independent wheel suspension structures. A drag link 42 connects a steering wheel control mechanism 39 and gear 39ᵃ of any well-known type to the steering knuckle tie rods 40, the drag link 42 having a universal joint connection at 39ᵇ with the actuating pitman arm 39ᶜ of the gear 39ᵃ. The drag link is pivotally connected to the tie rods for rotation about a vertical axis passing through the point 41 or arranged in close proximity thereto at such point or points that the axis of either wheel 15 and 16 is substantially unchanged with respect to axes 31 and 36 respectively when either wheel rises or falls when the vehicle is driven straight ahead. A guide or idler link 43 pivotally connected to the cross member 12 of frame 10 at point 44 is also pivotally connected to the tie rods 40 for rotation about a vertical axis passing through the point 41. Since the point of steering control originates at point 41 and this point coincides with the intersection of the axes of oscillation 31 and 36, the geometry of the steering mechanism will not be affected by displacement of the wheels in either the same or opposite directions during operation of the vehicle. The tie rods 40 are connected to the steering arms 20 by ball and socket joints 45 or other suitable universal joint connections.

Referring more particularly to Figs. 4 and 5 of the drawings, it will be noted that the idler link 43 is connected to the cross member 12 of frame 10 at its guiding end by means of pivot pin 44 and is provided with a bearing 46 for receiving the pivot pin. At the opposite end link 43 is provided with a bearing 47 for receiving a spindle 48. The drag link 42 is connected to the spindle 48 as indicated in Fig. 4. The lower end of the spindle 48 is enlarged and provides a co-axial cylindrical bearing portion 50 upon which the interconnected end of the steering knuckle tie rods 40 may be journaled. The axis 51 of the spindle 48 projects vertically through the point 41 at the intersection of the axes of oscillation 31 and 36 of the wheel suspension structures. Each of the steering knuckle tie rods 40 is provided with a socket portion 52 and a yieldable or resilient material, such as rubber, is interposed between the cylindrical bearing portion 50 and each of the socket members and also separates the socket members from each other. The yieldable or resilient element 53 is preferably of a rubber composition which may be molded in place and vulcanized to the cylindrical bearing portion 50 and to each of the socket members 52. The spindle 48 is arranged for rotation about its own axis 51 and for revolution about the axis of the pivot pin 44 but is not permitted other angular movement relative to the frame 10. Angular movement of the steering knuckle tie rods 40 relative to the frame 10 will be taken up by the resilient element 53 during displacement of the wheels 15 and 16 incident to the operation of the vehicle. The resilient element 53 also serves to dampen vibration of the wheels and steering mechanism connected thereto and to prevent the transmission of shock from the wheels to the steering control mechanism of the vehicle.

In operation of my steering mechanism it is apparent that bearing 46 of the idler or guide link 43 is relieved of the load transmitted from steering gear 39ᵃ and drag link 42 to the tie rods 40 when wheels 15 and 16 are steered; bearing 46 being further relieved of road shocks transmitted from these wheels through the tie rods to the drag link and steering gear. Bearing 46 and link 43 may therefore be relatively small and of light weight and objectionable bearing wear minimized.

In the above construction the distance members 27 and 34 are preferably made sufficiently strong to prevent axle roll under braking torque applied at the independently sprung wheels. These distance members may also have shock absorbers actuated thereby as hereinafter more particularly referred to in connection with the Fig. 10 embodiment of my invention.

Referring to Figs. 6 and 7 of the drawings, another embodiment of independent wheel suspension structures is shown in which axle members 61 and 62 corresponding to the individual axle members 21 and 22 of the previously described embodiment are provided with a sharper angular bend in a rearward direction adjacent the steering knuckle pin 23 so that each axle is disposed wholly on the same side of the longitudinal central axis of the frame 10, such axis coinciding with the line 8—8 of Fig. 6. Distance members 27 and 34 are secured to the axle members 61 and 62 by bolts 28 which also serve to secure the lower spring pad 24 to the axle as in the previously described embodiment. The ends of the axles and of the distance members are provided with bearings 26, 30, 33 and 35 with the axis of bearings 30 and 26 extending in a direction such that they intersect the vertical plane of the steering knuckle pivot pin 23 at a point outside the pivot pin of wheel 16 and the bearings 33 and 35 are in alignment so that the axis thereof intersects the plane 32 of the knuckle pivot pins outside the steering knuckle pivot pin 23 of wheel 15 and approximately directly above the center of the tread of that wheel. The axis 31 of the bearings 26, 30 and the axis 36 of the bearings 33, 35 intersect at point 41 at which the steering control of the steering mechanism originates. In this construction as in the previous embodiment each wheel has a long effective transverse swinging radius approximately equal to the tread between the wheels 15 and 16. By arranging the axles 61 and 62 both on opposite sides of the central longitudinal axis of the frame but not crossing the latter, no provision need be made to avoid interference between the axle members so that the statically determinate wheel suspension structures including the frame 10, resistance members 27 or 34, and the axles 61 or 62 in this instance may be made planar and of the desired longitudinal and transverse rigidity. In this embodiment of the invention the bearing members 30 and 35 are disposed substantially in the longitudinal vertical plane of the side sills 11 while the bearing members 26 and 33 are fixed to cross members or intermediate frame structure. In this embodiment, likewise, any desired form of spring suspension or equivalent cushioning means may be employed for resiliently mounting the frame of the vehicle on the running gear therefor.

In the steering mechanism disclosed by way of illustration in conjunction with the latter embodiment of wheel suspension means, steering knuckle tie rods 60, corresponding to the tie rods 40 of the previously described embodiment, are both connected at the inner ends thereof to the idler or guide link member 63 so that their inner ends are brought together. A drag link 72 is pivotally connected to the aforesaid arm 39c and gear 39a of the steering control mechanism, and to the idler link 63 at a point spaced rearwardly from the connection between the steering knuckle tie rods and the link 63. All of these connections are preferably arranged in close proximity to the point 41 which represents the intersection of the axes 31 and 36 about which the wheel suspension structures are adapted to oscillate.

Referring more particularly to Figs. 8 and 9, the guide link 63 is provided with a bearing portion 66 by which it is pivotally connected and guided through the intermediary of the pivot bolt 44 to a suitable portion of the frame 10 such as the said cross member 12. At the other end the link 63 is provided with longitudinally spaced downwardly extending arms 64, 65, each provided with a ball or spherical portion 66 respectively adapted to be connected to the steering knuckle tie rods 60 and to the drag link 72. Each of the steering knuckle tie rods 60 and the drag link 72 are provided with generally correspondingly formed sockets 67 and 67a respectively, the sockets being of spherical shape and cut away at the upper portion for the admission of the spherical ends 64 and 65. The sockets 67 do not extend all of the way around spherical member 66. Resilient or yieldable elements 68 are interposed between the spherical members 66 and the sockets 67, and preferably these yieldable elements are of rubber composition adapted to be molded in place and vulcanized to both the spherical or ball ends 66 and the sockets 67. The arm 63 is adapted to revolve about the pivot bolt 44 in guiding and supporting the inner ends of the tie rods and drag link but is preferably adapted to have no other angular movement with respect to the frame 10. The yieldable elements 68 are adapted to take up or damp vibration transmitted from the wheels, to prevent the transmission of shock and vibration from the wheels to the steering control mechanism and to yield to permit angular movement of the steering knuckle tie rods 60 with respect to the frame of the vehicle upon displacement of the wheels incident to operation of the vehicle.

Referring now to Figs. 10 to 14 of the drawings reference character A represents the chassis frame having cross member 70 thereof, and B indicates the usual front steering ground wheels of the motor vehicle.

I have illustrated this modification of my invention in connection with steering wheels of a somewhat more conventional type of independent springing in which each wheel B is rotatably mounted on a spindle 71 swivelled by a pin 72 to a generally vertical link 73 having its ends pivotally connected at 74 and 75 to the upper and lower links or wishbones 76 and 77 respectively.

The inner arms of wishbone 76 are provided with pivotal bearings 78, 79 spaced longitudinally of the vehicle and supported by cross member 70 through the intermediary of shock absorber 80. Likewise each wishbone 77 has its inner arms provided with longitudinally spaced pivotal bearings 81, 82 supported by member 70. Wheels B yieldably support chassis A by suitable springs herein illustrated as coil springs 83 between cross member 70 and wishbones 77.

One of the wishbones of each wheel B and preferably the somewhat longer lower wishbones 77 have their bearings 81, 82 axially aligned, such axes 84, 85 converging rearwardly to intersect the longitudinal median plane 86 of chassis A at the point 87 adjacent the rear bearings 81. The other wishbones 76 having their bearings 78, 79 similarly axially aligned, such axes 88, 89 extending rearwardly parallel to axes 84, 85 respectively and converging at a common point (not shown) intersecting plane 86 rearwardly of joint 87.

In operation of the wheel suspension of Figs. 10 and 11 as thus far described it will be apparent that either wheel B may be independently displaced upwardly or downwardly as it rotates, such displacement being guided about the parallel pairs of associated axes 84, 88 and 85, 89 as the case may be. During such displacement of any wheel B, such wheel has its axis 71 practically unchanged, such axis being displaced in parallel positions by reason of wishbones 76, 77 and arm 73.

Referring now to my improved steering mechanism, each spindle 71 has an arm 90 extending rearwardly therefrom for connection through a ball and socket universal joint 91 with a tie rod 92 or 93.

Pivoted at 94 to cross member 70 is an idler guide link 95 having a bearing portion 96 for said pivot 94, said link preferably extending rearwardly from its pivot along the plane 86 when said wheels B are positioned for straight ahead running of the motor vehicle. Tie rods 92, 93 have their inner ends connected through ball and socket joints 97, 98 respectively to the guide link 95. The joints 97, 98 are positioned in association with axes 84, 85 respectively so that, with wheels B positioned as illustrated, such wheels are substantially motionless regarding movement on pins 72 when either of the wheels is displaced due to an irregularity in the roadway. In other words the arm joints 91 are permitted to follow their natural paths of movement on wheel displacement, such paths being defined by the wheel supporting and guiding linkage. In Fig. 10 I have illustrated the pivotal joints 97, 98 as lying to one side of axes 84, 85 respectively associated therewith although I desire to point out that such relationship may vary according to the degree in which the aforesaid desirable results are obtained and also according to the particular form and arrangement of wheel suspension employed. Thus, these joints 97, 98 may be located to either side of their associated respective axes 84, 85 or they may be intersected by these axes as shown in Fig. 13 in which the same reference characters are employed. Deviation of the vertical center lines of joints 97 and 98 from their associated axes 84 and 85 respectively is desirable in many instances in order to compensate for the movement of the steering arm joints 91 in a path which is not truly circular about an axis in plane 86 but deviates slightly therefrom owing, among other things, to the inclination of axes 84, 85, 88 and 89; also by reason of the positioning of tie rods 92, 93 out of perpendicular with these wishbone pivotal axes. The aforesaid path is further distorted from a truly circular path in the illustrated embodiment owing to the difference in length and location of the upper and lower wishbones 76 and 77 respectively. Thus, the arrangement is preferably such that, for the wheel suspension employed, the joints 97, 98 are located to alter as little as possible the path of movement that the joints 91 tend to naturally follow on vertical wheel displacement.

Spaced from joints 97, 98 is a further universal joint 99 at the rear end of link 95 for pivotally connecting the drag link 100 thereto. This drag link is connected through a ball and socket joint 101 to an actuating arm 102 of the steering gear 103 of any well-known type adapted for actuation by steering shaft 104 leading to the usual manually operated steering wheel (not shown).

In Fig. 12 I have illustrated the details of one form of ball and socket or universal joint which may be used for the various pivotal joints referred to hereinbefore. In this figure the joint 99 is formed by the metal ball 105 secured at 106 to the idler link 95, the socket 107 having ball-receiving metallic bearing portions 108 and having a sleeve 109 threadedly receiving drag link 100.

The link 95 guides the ends of the drag link 100 and tie rods 92, 93 connected thereto for transmitting steering movement to wheels B from steering movement to wheels B from steering gear 103, it being observed that bearing 96 is relieved of this steering force. Furthermore, road shocks experienced at wheels B are transmitted directly from the tie rods to the drag link and steering gear 103 independently of the bearing 96. Hence such forces and shocks do not pass through bearing 96.

Since many changes could be made in the above constructions and many apparently widely different embodiments of this invention could be effected without departing from the scope thereof, it is intended that all matter contained in the above description or shown in the accompanying drawings shall be interpreted as illustrative and not in a limiting sense.

What is claimed is:

1. In a motor vehicle, a frame, steerable wheels arranged at each side of said frame, a steering knuckle for each wheel, independent suspension means comprising an individual axle for each wheel pivotally mounting the steering knuckle therefor, resilient means connecting each axle to said frame, steering mechanism connected to said steering knuckles and having a single control point, a steering operator articulated to said steering mechanism at said control point and means for pivotally connecting each axle to said frame for oscillation about an axis inclined at an acute angle with respect to the vertical longitudinal mid-plane of the vehicle, said axis intersecting a like inclined axis of oscillation of the other axle approximately at the single control point of said steering mechanism.

2. In a motor vehicle, a frame, steerable wheels arranged at each side of said frame, a steering knuckle for each wheel, means for steering said wheels, an individual axle for each wheel, steering knuckle pins arranged in the same plane and pivotally connecting each axle to the steering knuckle therefor, resilient means connecting each axle to said frame for oscillation about an axis intersecting the plane of said steering knuckle pins at a point laterally outside the steering knuckle pin of the other axle.

3. In a motor vehicle, a frame, steerable wheels arranged one at each side of said frame, a steering knuckle for each wheel, means for steering said wheels, an individual axle for each wheel, steering knuckle pins arranged in the same plane and pivotally connecting each axle to the steering knuckle therefor, resilient means connecting each axle to said frame for oscillation about an axis intersecting the plane of said steering knuckle pin at a point adjacent the steering knuckle for the other axle.

4. In a motor vehicle having steering ground wheels, means including a pivotally supported link for swingingly guiding each of said wheels for vertical displacement independently of the other wheel, means for imparting steering movements to said wheels including a tie rod extending for steering connection to each wheel, means for pivotally supporting the inner ends of said tie rods for pivotal movement of the tie rods about a common point, the axes of pivoting of said links converging toward one another and approximately intersecting said common pivotal point.

5. In a motor vehicle having steering ground wheels, means including a pivotally supported link for swingingly guiding each of said wheels for vertical displacement independently of the other wheel, means for imparting steering movements to said wheels including a pivotally supported tie rod extending for steering connection to each wheel, the axes of pivoting of said links converging toward each other and extending in close proximity to said tie rod pivots respectively, said tie rod pivots having a common point about which said tie rods pivot in response to wheel displacement.

6. In a motor vehicle having steering ground wheels, means including a pivotally supported link for swingingly guiding each of said wheels for vertical displacement independently of the other wheel, means for imparting steering movements to said wheels including a pivotally supported tie rod extending for steering connection to each wheel, the axes of pivoting of said links converging toward each other and extending in close proximity to said tie rod pivots respectively, said tie rod pivots having a common point about which said tie rods pivot in response to wheel displacement, said steering means including a drag link and an element pivotally connected thereto and actuated thereby, said drag link pivot lying substantially in a vertical line passing through said common pivotal point of said tie rods.

7. In a motor vehicle having steering ground wheels and a steering gear therefor, tie rods adapted to transmit steering movement to said wheels, means including a drag link operably connected to said steering gear for actuation thereby, a member adapted to operably connect said drag link and tie rods, and means connecting said tie rods to said member and providing a common point of pivotal movement for said tie rods relative to said member, and means for pivotally connecting said drag link to said member at a point spaced longitudinally of the vehicle from said common point.

8. In a motor vehicle having steering ground wheels and a steering gear therefor, tie rods adapted to transmit steering movement to said wheels, means including a drag link operably connected to said steering gear for actuation thereby, a member adapted to operably connect said drag link and tie rods, means connecting said tie rods to said member and providing a common vertical axis of pivotal movement for said tie rods relative to said member, and means connecting said drag link to said member for pivotal movement relative thereto about an axis spaced longitudinally of the vehicle from said common axis.

9. In a motor vehicle, a frame structure, steerable wheels at each side of said frame forwardly of the vehicle, a steering knuckle structure mounting each wheel for steering movement, means for mounting each of said steering knuckles for independent rising and falling movement of said wheels, said mounting means including an axle associated with each of said wheels, steering mechanism connected to said steering knuckles and having a single control point, and means for pivotally connecting each of said axles to said frame structure for oscillation about an axis intersecting a like axis of oscillation of the other axle approximately at said control point of said steering mechanism, said axes lying at acute angles with the longitudinal vertical mid-plane of the vehicle.

10. In a motor vehicle, the combination with a vehicle frame structure, of a pair of steerable road wheels disposed at opposite sides of and adjacent the forward end of said frame structure, means associated with each of said wheels and said frame structure for supporting and guiding said wheels for independent rising and falling movement, each of said wheel supporting and guiding means including at least one link having arms diverging from a wheel for pivotal connection to said frame structure, means providing a pivotal connection between the ends of said diverging arms of each of said links and said frame structure whereby each of said links swings about an axis inclined at an acute angle with respect to the longitudinal vertical mid-plane of the vehicle, a steering knuckle structure adapted to provide steering movement for each of said wheels about a substantially vertical axis, steering motion imparting means for said knuckle structures and including a pair of tie rods, said steering means including an idler guide member pivotally mounted on said frame structure for swinging movement, said member having its pivot disposed substantially in said mid-plane, means for pivotally connecting the outer ends of said tie rods to said knuckle structures respectively, and means for pivotally connecting the inner end of each of said tie rods to said idler guide member in sufficient proximity to the inclined axis of the link which guides movement of said tie rod pivotal connection so that undesired movement of the knuckle structures about their respective steering axes is avoided during rising and falling of the wheel associated therewith, said links having their diverging arms so disposed in relation to the inner ends of said tie rods that the frame pivotal connections of each link arms lie spaced in the same direction along the inclined axis of swing of such link from the tie rod pivot in proximity to this inclined axis as aforesaid.

11. In a motor vehicle having steering ground wheels and a steering gear therefor, an idler guide link extending longitudinally of the vehicle, means for pivotally supporting said guide link at one end thereof approximately in the vertical longitudinally extending mid-plane of the vehicle whereby the other end of the guide link is free to swing transversely of the vehicle, steering motion transmitting means articulated between said steering gear and the swinging end of said guide link, each of said wheels having a steering arm for imparting steering movement thereto, tie rods articulated at their outer ends to said steering arms respectively and at their inner ends to said guide link, means including a substantially V-shaped link for swingingly mounting each of said wheels for vertical displacement thereof independently of the other wheel, a pair of axially aligned pivotal supports for the diverged ends of each of said V-shaped links, the axes of said supports for said V-shaped links being inclined at an acute angle to said mid-plane, projections of said axes beyond the spaces between said pairs of pivotal supports passing in sufficient proximity to the inner ends of said tie rods respectively so that undesired movement of said steering arms is avoided during vertical displacement of said wheels when the vehicle is travelling approximately straight ahead.

12. A motor vehicle according to claim 11 wherein, both of the pivotal supports for a V-shaped link are disposed rearwardly in appreciably spaced relationship from a transverse vertical plane approximately containing the axes of rotation of said wheels.

PAUL K. BEEMER.

CERTIFICATE OF CORRECTION.

Patent No. 2,154,558.   April 18, 1939.

PAUL K. BEEMER.

It is hereby certified that error appears in the printed specification of the above numbered patent requiring correction as follows: Page 3, first column, line 1, for the word "on" read no; and that the said Letters Patent should be read with this correction therein that the same may conform to the record of the case in the Patent Office.

Signed and sealed this 30th day of May, A. D. 1939.

Henry Van Arsdale (Seal)   Acting Commissioner of Patents.